Aug. 3, 1954 R. E. SPOKES 2,685,551
FRICTION ELEMENTS AND METHODS OF MAKING THE SAME
Filed Oct. 17, 1951 6 Sheets-Sheet 1

INVENTOR.
Ray E. Spokes
BY Wallace and Cannon
ATTORNEYS

Aug. 3, 1954     R. E. SPOKES     2,685,551
FRICTION ELEMENTS AND METHODS OF MAKING THE SAME
Filed Oct. 17, 1951     6 Sheets-Sheet 2

INVENTOR.
Ray E. Spokes
BY Wallace and Cannon
ATTORNEYS

Fig. 5 DYNAMOMETER TEST SHOWING AVERAGE COLD DRUM PERFORMANCE MATERIAL - ALFIN BUNA S LINING

Fig. 6 DYNAMOMETER TEST SHOWING AVERAGE COLD DRUM PERFORMANCE MATERIAL - EMULSION BUNA S LINING

INVENTOR.
Ray E. Spokes
BY
Wallace and Cannon
ATTORNEYS

Fig. 7

DYNAMOMETER TESTS SHOWING
AVERAGE EFFECTIVENESS RANGE DURING WEAR TESTS AT VARIOUS SPEEDS
MATERIAL - ALFIN BUNA S LINING

Fig. 8

DYNAMOMETER TESTS SHOWING
AVERAGE EFFECTIVENESS RANGE DURING WEAR TESTS AT VARIOUS SPEEDS
MATERIAL - EMULSION BUNA S LINING

INVENTOR.
Ray E. Spokes
BY Wallace and Cannon
ATTORNEYS

Fig. 9 — Dynamometer test showing fade and recovery. 60 M.P.H. Material—Alfin Buna S Lining Fig. 10 — Dynamometer test showing fade and recovery. 60 M.P.H. Material—Emulsion Buna S Lining Aug. 3, 1954 R. E. SPOKES 2,685,551
FRICTION ELEMENTS AND METHODS OF MAKING THE SAME
Filed Oct. 17, 1951 6 Sheets-Sheet 6

INVENTOR.
Ray E. Spokes
BY
Wallace and Cannon
ATTORNEYS

Patented Aug. 3, 1954

2,685,551

UNITED STATES PATENT OFFICE 2,685,551

FRICTION ELEMENTS AND METHODS OF MAKING THE SAME

Ray E. Spokes, Ann Arbor, Mich., assignor to American Brake Shoe Company, Wilmington, Del., a corporation of Delaware Application October 17, 1951, Serial No. 251,738

7 Claims. (Cl. 154—140)

This invention relates to friction elements, and more particularly to friction elements bonded with a vulcanized elastomer, which is more thermoplastic than those linings heretofore bonded with synthetic resins or plasticized synthetic resins. This invention also relates to methods of making such elements and to novel bonding ingredients used therein.

Friction elements used in brake linings, clutch facings and the like generally comprise friction materials such as asbestos fibers, friction-controlling and imparting ingredients, and a bond usually of organic materials such as drying oil, natural or synthetic rubber, resins or mixtures thereof. In addition, other materials such as inert inorganic compounds may be added to augment certain properties such as heat resistance, friction and abrasion resistance which play an important part in any friction element. Generally speaking, friction elements are prepared from these ingredients by mixing the various components in a solvent, molding the viscous mass into approximate shapes, curing to form a firm structure and finally cutting the sheets or webs into suitable lengths for use in conventional applications.

The various physical and thermal strains to which friction elements are subjected dictate that they exhibit an optimum balance as to thermal stability, high coefficient of friction, sustained surface uniformity, and strong internal resistance to quick and sudden decelerations. As would naturally be expected, it is the bonding agent of the friction element which must account in a large part for this balance. If the binder is not thermally stable for instance, it will, among other things, soften under conditions of use; and unless the friction element itself displays a strong internal resistance to stresses and strains as well as resistance to thermal softening produced by quick and sudden stops, the element is scuffed, that is, pitted and roughened on its surface in a non-uniform manner, and will exhibit a marked tendency to produce jerky, non-uniform effects in use, especially since the degree of scuffing is not uniform between wheels. Moreover, the high flash temperatures extent in usage, reaching as high as 1000° F. on the surface of the friction element in some instances, result in a decrease or fading out of the friction-exerting properties due to binder deterioration. As a result there is an inability on the part of the element to recover its previous frictional condition. This phenomenon has been termed "fade and recovery" in the art, and while the exact cause therefor has yet to be definitely determined, there is some evidence that it may be the result of a non-dissipatible accumulation of by-product glazes on the surface of the friction element.

The most common bonding agents for friction elements comprise thermosetting resins and/or a synthetic rubber as the principal ingredient thereof. The resins, such as Bakelite, are inherently strong and hard, while the rubber binders are soft and tough. Empirically speaking, the binder is usually chosen according to the degree of hardness desired in the friction element, and as would be expected various mixtures of the above are often chosen in this respect.

The present disclosure is concerned primarily with the class of synthetic rubbers as the principal ingredient of the bonding agent, for in certain applications it appears desirable from the standpoint of brake noise elimination to have a lining which possesses maximum softness. When considered from this aspect alone, natural rubber would appear to be the most satisfactory, but its fade and recovery properties are very poor, probably due to its high susceptibility to thermal breakdown, bearing in mind that braking temperatures of 700° F. are quite common. This fact alone renders natural rubber highly unsatisfactory as a bonding agent, and accordingly, in the field of softer friction elements, the art has turned to synthetic rubber. Buna S (butadiene-styrene copolymer) produced by the conventional emulsion process, hereinafter referred to as emulsion Buna S, has been utilized in the manufacture of friction elements. However, this rubber exhibits a marked tendency toward softening and thermal breakdown in use, and friction elements bonded with this material tend to scuff excessively. In order to obtain a satisfactory lining bonded with emulsion Buna S, it is necessary to resort to special equipment for processing in which asbestos fibers are tightly interlaced, as by use of a sheeter process in which long-fibered asbestos is used, the soft stock being introduced between the bite of two rollers—one hot and one cold. Each rotation of the rollers forms a sheet about 0.002" thick on the hot roll. A ratchet adjusts the distance between the rolls and the thickness of the sheet is built up, after which the sheet is removed from the roll. Any residual solvent is removed by baking, and the final sheets are cut and cured preferably under heat and pressure. A tough, laminated lining is thus produced in which the interweaving of the long asbestos fibers helps to compensate for any weakness produced by the softening or thermal breakdown of the conventional emulsion Buna S binder. While a satisfactory lining for some purposes can be produced from emulsion Buna S in this manner, the process is expensive. Moreover, it has been observed that the fade and recovery properties of sheeter-processed linings are somewhat poor and that their ability to maintain a constant friction level is not entirely satisfactory. Attempts have been made to substitute conventional extruding and rolling processes for making friction elements from emulsion Buna S, but the absence of interweaving among the fibers, regardless of the amount used, results in a Buna S lining which is even less satisfactory than that produced by the sheeter process. Therefore, to date it has been impossible to produce a satisfactory friction element bonded exclusively with rubber, either natural or synthetic, that will not exhibit a tendency toward scuffing after severe service and subjection to high temperatures unless compounded by the sheeter process.

It is therefore an object of this invention to produce a satisfactory friction element employing a synthetic rubber as the sole bonding ingredient therein, and to eliminate dependence of the sheeter process for compounding the same.

It is a further object of this invention to provide a friction element which displays marked improvements over those friction elements heretofore produced by the sheeter process.

It is a further object of this invention to provide a friction element displaying substantially no tendency to scuff under sustained application and having optimum properties of fade and recovery.

Yet a further object of this invention is to provide a friction element bonded exclusively with a synthetic rubber that exhibits a relatively strong resistance to thermal breakdown and softening under conditions of use.

More specifically, it is an object of this invention to produce a friction element in which the principal ingredient of the bonding agent is a butadiene-styrene copolymer obtained by reacting butadiene and styrene monomers in a pentane solution in which a complex, mixture or reaction product of sodium isopropoxide and amylsodium is present.

Still a further object of this invention is to improve upon presently existing methods for the production of friction elements employing synthetic rubber as the principal ingredient in the bonding agent.

Still a further object of this invention is to provide a novel composition of matter that permits a butadiene-styrene copolymer to be used as the principal ingredient in the bonding agent for friction elements without the need for pre-treating or milling the copolymer.

Other objects of the invention will be apparent from the discussion to follow.

In contrast to the friction elements heretofore manufactured in which conventionally prepared (emulsion-processed) Buna S has been attempted to be employed as the principal ingredient for the bonding material thereof, I am using Buna S synthetic rubber that has been prepared by a catalytic process which, for purposes of materially reducing the language of this disclosure, will hereinafter be referred to as "Alfin rubber" or "Alfin Buna S." The published information on this relatively new synthetic rubber is meager, and due to its resistance to conventional milling processes and incorporation of fillers, investigations have been largely restricted to its chemical and physical properties. However, this resistance property of Alfin Buna S presents no problem as far as the present invention is concerned, since I have discovered it to be readily reduceable to a cement and adaptable to a surface wetting and coating process. Not only have I found that the use of this synthetic rubber completely eliminates the need for dependence upon the sheeter process to produce a satisfactory friction element from Buna S, but I have also found that friction elements which employ Alfin Buna S as the principal ingredient in the bonding agent thereof exhibit a marked improvement over the Buna S friction elements heretofore produced in the art. Thus, the friction element of the present invention is characterized by its ability to be produced by one of several methods, the friction elements so produced possessing similar properties in all respects. Further, the friction elements of the present invention exhibit little tendency to show a surface scuffing under severe service conditions which develop a marked softness with ordinary rubber-bonded friction elements, show a marked improvement in fade and recovery, and need not to be compounded with long-fibered asbestos heretofore found to be necessary in the sheeter process.

Figure 1:
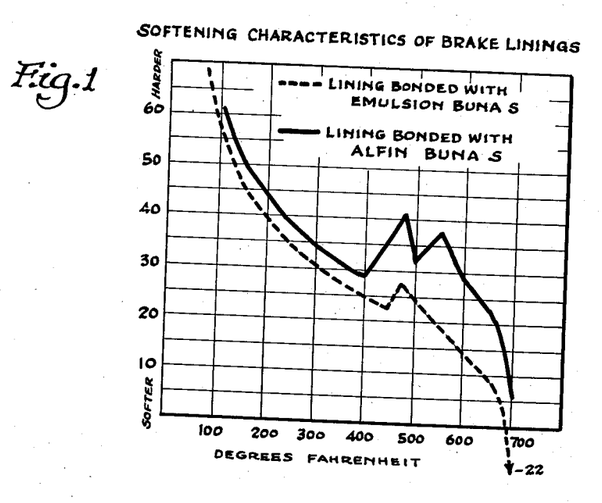
Fig. 1 is a graph showing thermal softening characteristics of two brake linings.
Figure 2:
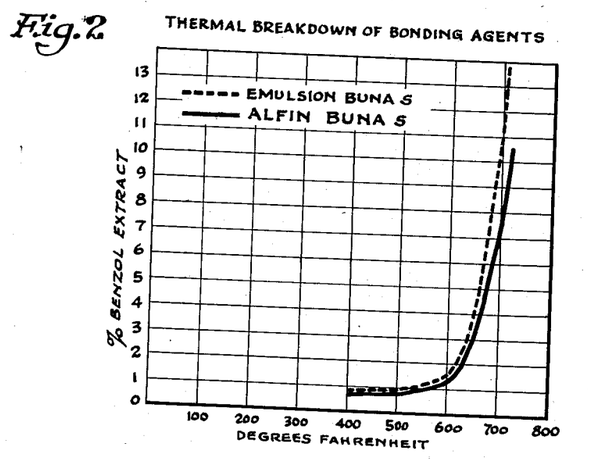
Fig. 2 is a graph showing thermal breakdown characteristics of the bonding agents used in the same two brake linings.

Since the present invention is primarily concerned with friction elements bonded with synthetic rubber as hereinbefore mentioned, the disclosure, for purposes of a better understanding, will proceed along a line of comparison between conventional Buna S linings and the linings of the present invention which are bonded with Alfin Buna S. As stated before, Alfin rubber is of relatively recent origin. Compared to conventional emulsion Buna S, it is characterized by extremely high molecular weights, more external double bonds, higher Mooney viscosity and a greater degree of transconfiguration around the internal double bonds. These properties alone, however, as with most organic compounds, do not permit any prediction of expected physical properties, and in order to determine if there was any particular characteristic which might indicate why linings bonded with Alfin rubber as the sole bonding agent should show such marked improvements in fade and recovery and scuffing tendency over linings bonded with emulsion Buna S, certain conventional tests were made. In these tests, an extruded Alfin Buna S lining was compared to a sheeted emulsion Buna S lining, the latter being compounded with long-fibered asbestos and bonded with the toughest possible emulsion Buna S copolymer. The impact strength of the two linings was compared at various temperatures, a cube approximately 0.2″ deep being used in each case. From this standpoint, the lining bonded with emulsion Buna S was almost twice as strong, showing an impact of 0.283 ft. lb. at 600° F. as compared to 0.150 ft. lb. at the same temperature for the lining bonded with Alfin Buna S. Similarly, emulsion Buna S exhibited a higher tensile strength at 600° F., namely, 950.9 lbs./in.$^2$ as compared to 721.9 lbs./in.$^2$ at the same temperature for the lining bonded with Alfin rubber. Approximately the same variance was present at 70° F., 200° F., and 400° F. It will be observed that there is certainly nothing in its ordinary physical characteristics which would account for any superiority of the lining of the present invention; in fact, the above characteristics point the other way. However, the study was carried a step further to a comparison of thermal characteristics. Fig. 1 is a graph of thermal softening of brake linings and Fig. 2 is a graph showing thermal breakdown of the bonding agents. From Fig. 1 it will be observed that in the important range of 400° F. to 700° F., the lining bonded with Alfin Buna S displayed a greater resistance to softening. At 700° F., for instance, the average reading for Alfin Buna S was a softness of 6 (Rockwell "R" scale), whereas the emulsion Buna S lining was so soft at this point that only one reading (−22) could be obtained. Referring to the graph of Fig. 2, it will be seen that the percentage of benzol extractable material formed by thermal decomposition of the bonding agent has been used as a measure of thermal breakdown, the percentage being on a weight basis and plotted against the temperature. In the range of approximately 400° F. to 600° F. the slopes of the two curves are substantially equal, but beyond this range there is a decided divergence, the Alfin Buna S linings being the more thermally stable. In attempting, then, to account for the marked difference in results between the two linings, hereinafter to be more specifically referred to, the curves of Figs. 1 and 2 should be kept in mind, especially in view of the inconclusiveness of the ordinary tests of impact and tensile strength. However, it is to be understood that the scope of practice of the present invention is by no means to be limited to any particular theory, but at the same time I do not mean to propose that the absence of any substantial scuffing in the friction elements of the present invention, and improved properties of fade and recovery over prior art brake linings using emulsion Buna S, is due absolutely to the relative thermal stability and softening characteristics of the Alfin Buna S bonding agent.

Having considered the background of the present invention and having particularized the field as related to friction elements bonded with synthetic rubbers of the Buna S class, I shall now describe the manner of making and compounding the same.

To date, there are several known equivalent catalysts used in producing Alfin Buna S, all included under the heading of Alfin catalysts. In a final chemical analysis, there is a slight distinction between the various Alfin catalysts, but the presence of an olefinic sodium compound, namely, allylsodium, is common to all except the benzylsodium type. Further, in their immediate stage of production, there is commonly present an amylsodium-sodium isopropoxide mixture or complex. The real distinction occurs during the final stage of production of these Alfin catalysts, for the final additive may take the form of propylene (PP-type), toluene (benzylsodium type), diallyl (diallyl type), or toluene followed by propylene (PP-benzylsodium type). Moreover, there is a modified form (modified PP-type) in which excess sodium isopropoxide or sodium chloride is added to the PP-type Alfin catalyst. However, since the present invention is not concerned with the technology of producing Alfin Buna S itself, it is not deemed necessary to dwell on this point, and reference is herein made to the article "Alfin Catalyzed GR–S Type Polymers" appearing in Industrial and Engineering Chemistry, vol. 42, No. 12, December 1950. It need only be added that the same general procedure is followed in reacting butadiene and styrene monomers in the presence of the Alfin catalyst, namely, the vat is first charged with pentane, the monomers added, and finally the Alfin catalyst is introduced. The mixture is then agitated until polymerization is complete to produce a viscous, jelly-like Buna S copolymer. For the sake of clarity, then, the term "Alfin rubber" will hereinafter be used to define a Buna S synthetic rubber in which the butadiene and styrene monomers have been catalytically polymerized to form a butadiene-styrene copolymer in the presence of a pentane solution which contains a complex, mixture or reaction product of sodium isopropoxide and amyl sodium.

A typical formula which may be followed in manufacturing the friction elements of the present invention is as follows:

I

Component:

| | Parts by weight |
|---|---|
| Alfin rubber | 13.0 |
| Sulfur (curing) | 0.8 |
| Harvel Dust (Cashew nut shell liquid dust) | 10.0 |
| Zinc oxide | 8.5 |
| Benzothiazyl disulfide } accelerators | 0.1 |
| Copper-diethyl dithio carbamate } | 0.2 |
| Carbon black (lubricant) | 0.25 |
| Asbestos—Canadian grade 7D | 47.5 |
| Asbestos—Canadian grade 5K | 20.0 |
| Water (to make) | 2.0 |
| Xylene (solvent) | 15.0 |

In order to utilize these ingredients for producing friction elements either by the rolling process or by the extrusion process, the rubber, sulfur, zinc oxide, disulfide, carbamate, carbon black, and xylene are made into a cement. This is followed by the addition of water, and finally the Harvel Dust and asbestos fibers are added and the whole is mixed thoroughly. In the rolling process, the tacky stock produced in the above manner is rolled out between the bite of two rollers into sheets or webs of approximate thickness. The solvent is removed at 150° F., the sheets or webs are pressed for 10 minutes at 325° F. and 2000 p. s. i., and finally subjected to a conventional oven cure at 200–325° F. In the event that it is desired to produce an extruded lining, the initial viscous mass is simply extruded through an orifice of the shape of the cross section of the lining, freed from excess solvent, and then cured. It will be understood, of course, that the various times and temperatures are largely dependent upon the thickness desired in the friction element.

Another typical formulation which I have found to be satisfactory is as follows:

II

| Component: | Parts by weight |
|---|---|
| Alfin rubber | 12.25 |
| Sulfur (curing) | 0.75 |
| CNSL Dust (Harvel Dust) | 10.00 |
| Zinc oxide | 8.50 |
| Benzolthiazol disulfide } accelerators | { 0.20 |
| Copper dimethyldithiocarbamate } | { 0.10 |
| Carbon black (lubricant) | 0.25 |
| Water (as required for sheeting) | ---- |
| Toluol (solvent) | 15.0 |
| Asbestos—grade 7D | 27.5 |
| Asbestos—grade 5K | 20.0 |
| Asbestos—grade 3Z | 20.0 |

The rubber, sulfur, dioxide, disulfide, carbamate and carbon black are again made into a cement, and sufficient water is added depending upon workability. Finally, the Harvel Dust and asbestos are added and the whole is again mixed thoroughly. The resulting mass is ready to be processed as hereinbefore explained. The Harvel Dust set forth in the above examples represents dried cashew nut oil. It has very stable friction characteristics and high resistance to heat as well as greases and oils. The Alfin rubber I have worked with in both formulations has a butadiene-styrene ratio of 75-25 with a 75% conversion, and it has an MS-4 or Mooney viscosity of 57. Other ratios of butadiene to styrene have been experimented with, as for example 85-15 which was found to be satisfactory.

Mention was previously made of the fact that Alfin rubber exhibits a marked resistance to milling procedures and incorporation of fillers, and that for this reason practical research has been retarded. Strangely enough, this property has not presented any problem as far as the instant practice is concerned. In fact, I have found that it is not necessary to "work" or mill the Alfin rubber at all in order to obtain a free-spreading cement which results in a smooth lining. This is quite in contrast to the linings produced from conventional emulsion Buna S, for unless the latter is first subjected to a preliminary milling operation on a Banbury mill the cement is tough and non-flowing, tending to break up the asbestos fibers during the necessarily long period of mixing, and the asbestos-filled mixture itself is lumpy, even when compounded by means of the sheeter process. Further, if there is no preliminary milling of the emulsion Buna S rubber, the rubber swells and "balls up" in the cement irrespective of the amount of solvent used. Thus, unless conventional emulsion Buna S is premilled, it is almost impossible to do anything with it as far as the manufacture of friction elements is concerned, whereas the Alfin rubber produces a perfectly smooth lining without need for premilling, and this in spite of its higher viscosity. Another reason why the practical utilization of Alfin rubber has been at an impasse is the fact that it is difficult to mix it with fillers. Again, however, I have not experienced this difficulty, because I have found it to be relatively easy to prepare a cement from the Alfin rubber, and my treatment of the asbestos fibers and fillers therewith is one of surface wetting and coating rather than a direct admixture with the Alfin rubber.

Figure 3:
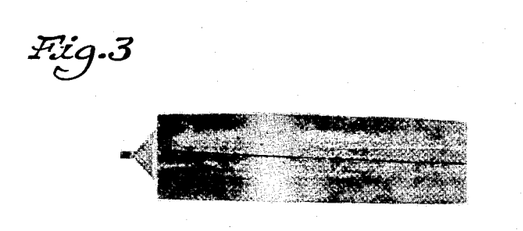
Fig. 3 is a photographic reproduction of a brake lining bonded with conventional materials.
Figure 4:
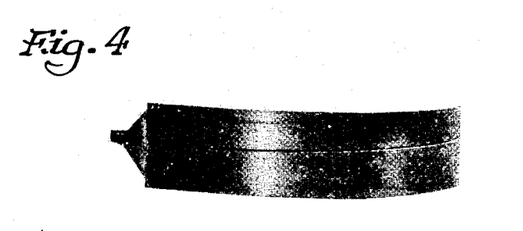
Fig. 4 is a photographic reproduction of a brake lining bonded in accordance with the present invention.

Referring to Figs. 3 and 4, it will be seen that the linings bonded with Alfin rubber exhibit little, or substantially no, evidence of scuffing after exposure to severe use. Thus, two extruded linings, one bonded with emulsion Buna S (Fig. 3) and the other bonded with Alfin rubber (Fig. 4), were subjected to a road test which consisted of an equal number of sudden stops at 70 M. P. H. Each of these arcuate linings (approximately a 105° segment) was about 2" wide and $\frac{3}{16}$" thick and was so mounted as to comprise a brake shoe. It was found that the surface of the conventional emulsion Buna S lining was scarred its entire length, slightly off center, with deep, wide and irregular scuff marks very similar to the result of scraping a piece of shoe leather against a rough surface. The two extreme sides were substantially free of any scuffing and only exhibited indiscriminate pock marks that evidenced what might be termed "normal wear." On the other hand, there was no indication of scuffing on the surface of the lining bonded with Alfin rubber; the surface was uniformly worn in a manner similar to the pocked sides of the emulsion Buna S lining as will be clear from a comparison of Fig. 3 and Fig. 4.

As was stated previously, the novel friction element of the present invention also shows marked improvements over emulsion Buna S linings from the standpoint of "fade and recovery" and friction characteristics. More specifically, a series of dynamometer tests were conducted, all of which were directed to a determination of the "effectiveness range" of the two types of linings at various speeds. The series consisted of "Average Cold Drum Performance," indicative of changes in friction level; "Wear Test," indicative of changes in friction level at high temperatures; and "Fade and Recovery," indicative of relative loss of friction and ability of the lining to recover its normal friction characteristics upon cooling. "Effectiveness range" is simply a range of values obtained by dividing the hydraulic line pressure by the deceleration obtained thereby. Thus, if 300 p. s. i. hydraulic line pressure were to produce a deceleration of 15 ft./sec.$^2$ at 60 M. P. H., the effectiveness value would be 20 lbs. L. P./ft./sec.$^2$. In other words, the higher the friction of the element, the lower the effectiveness value.

Figure 5:
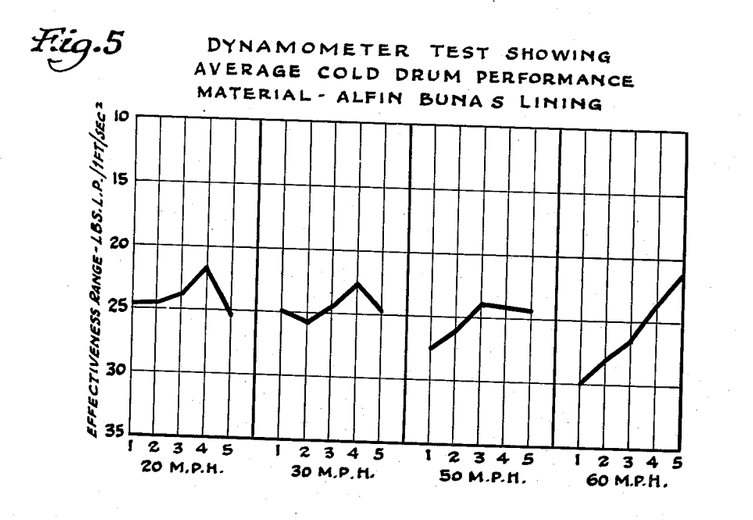
Figs. 5 and 6 are graphs showing cold drum performance of the respective brake linings.
Figure 6:
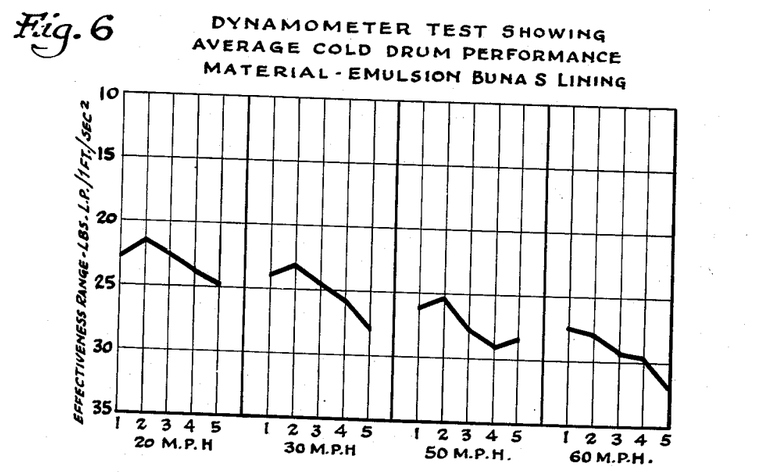

In the first test of the series, shown graphically in Figs. 5 and 6 as Cold Drum Performance, five stops each were made at speeds of 20, 30, 50 and 60 M. P. H. with a brake lining made of conventional emulsion Buna S (Fig. 6) having a Mooney viscosity of 110 and compounded with long fibered asbestos in the sheeter process. The effectiveness range steadily increased from a value of 21.6 (second stop at 20 M. P. H.) to 32.1 (last stop at 60 M. P. H.). On the other hand, an extruded Alfin lining (Fig. 5) made in accordance with the present disclosure and subjected to the same test varied between 24.5 (second stop at 20 M. P. H.) to 21.4 (last stop at 60 M. P. H.).

Figure 7:
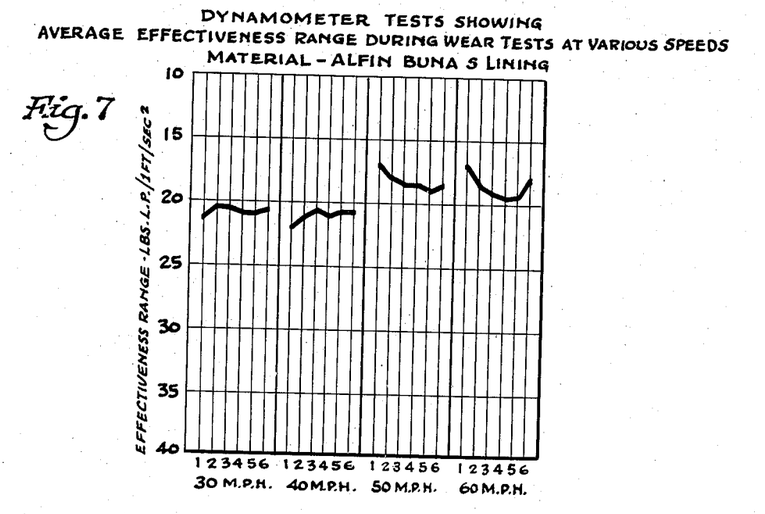
Figs. 7 and 8 are graphs of wear tests at various speeds of the respective brake linings.
Figure 8:
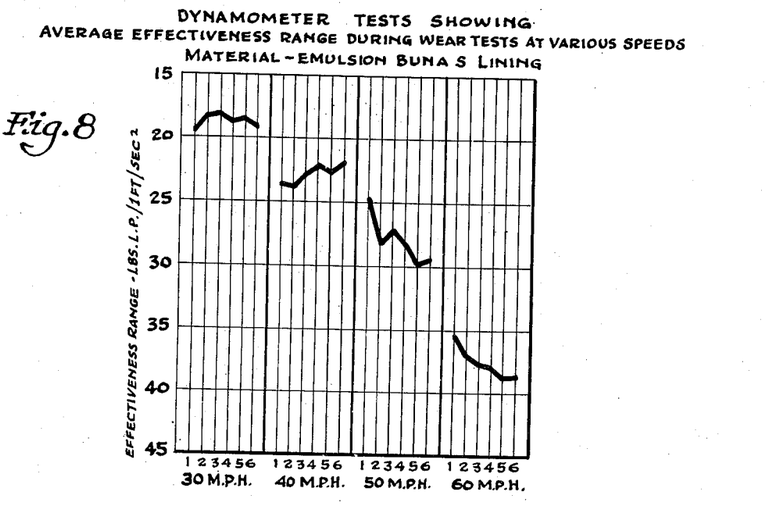
Figure 9:
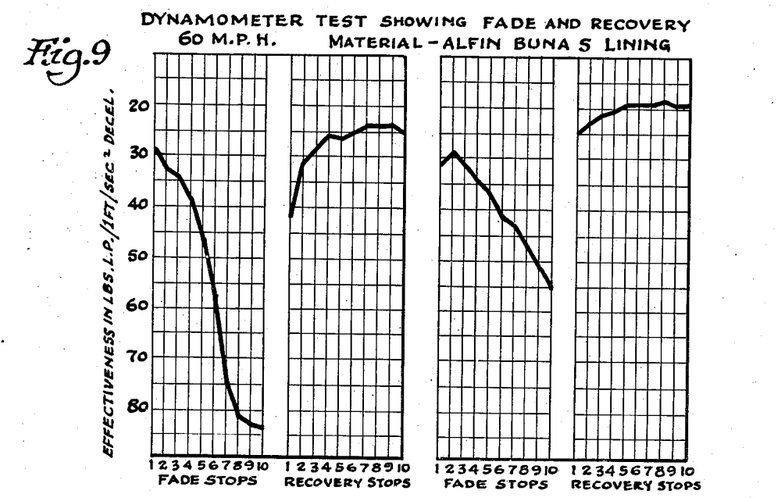
Figs. 9 to 12, inclusive, are graphs showing Fade and Recovery characteristics of the respective brake linings.
Figure 10:
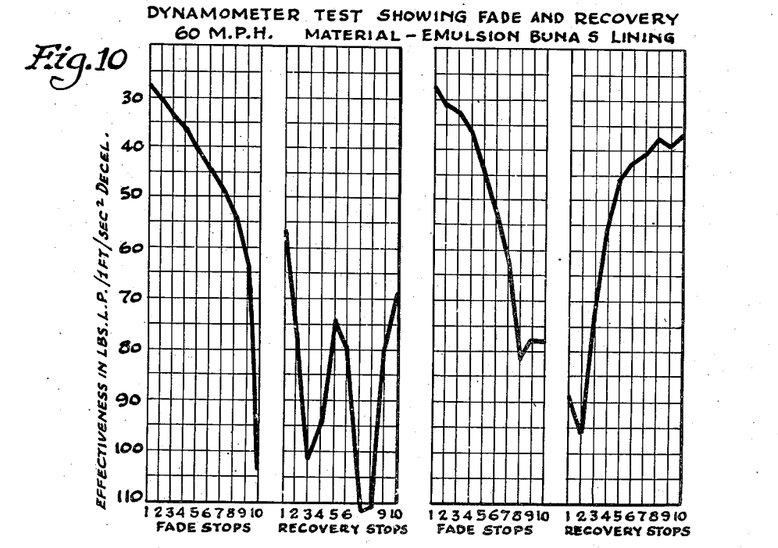
Figure 11:
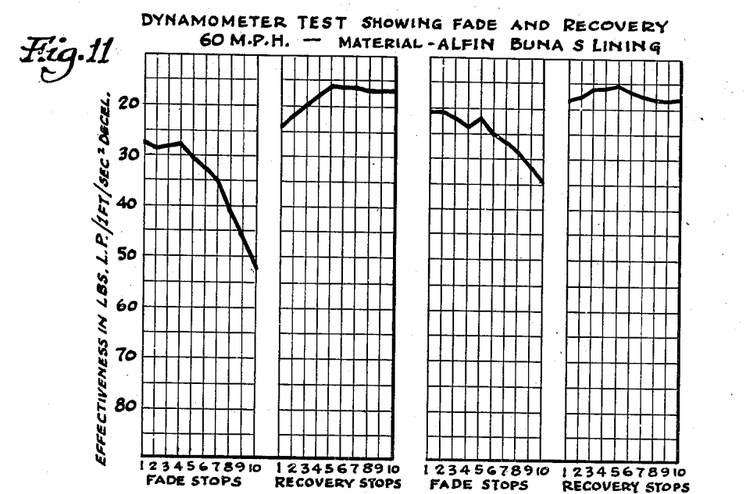
Figure 12:
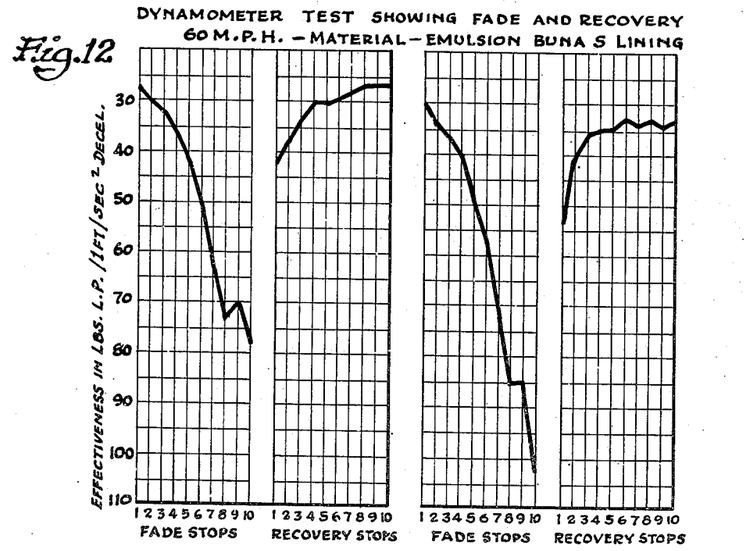

During wear testing, shown graphically in Figs. 7 and 8, the effectiveness of the same linings was compared at temperatures increasing from 250° F. to 500° F. at speeds varying progressively between 30 and 60 M. P. H. within this temperature range. The effectiveness range of the Alfin rubber lining (Fig. 7) actually decreased somewhat, wherein the friction emulsion Buna S lining increased rapidly along a relatively steep slope as will be apparent from the graph of Fig. 8.

The final comparative test, "Fade and Recovery," illustrated in Figs. 9 to 12, inclusive, was the most conclusive of the three. This test consisted of twenty stops from a speed of 60 M. P. H., the first 10 stops being made at one minute intervals resulting in a rapid increase in lining temperature, and the last 10 stops being made at three minute intervals thus allowing the lining to cool. The effectiveness range, then, will indicate the change in friction level during the first 10 stops and the ability of the lining, during the last 10 stops, to recover its original or normal friction level upon cooling, bearing in mind that "effectiveness range" varies in inverse relationship with respect to friction, increasing values of effectiveness indicating a corresponding decrease in friction. Four such tests were run on each of the two types of linings, as shown in Figs. 9 to 12. In all four instances, as shown in Figs. 9 to 12, respectively, on a comparative basis, the Alfin lining showed substantially less tendency toward fade and a much better ability to recover.

While specific reference has been made to brake linings, it is not my intention to limit the present invention thereto. Friction elements take various forms and shapes and undergo divergent applications in many fields such as clutch facings, belting, pulley linings, and the like, wherein it is desired, to maintain a firm and non-slipping contact between surfaces. Further, in view of the function of the various fillers and modifiers in the examples given, it will be understood that changes and alterations can be made therein without departing from the practice of the present invention as broadly defined by the use of Alfin rubber in compounding friction elements. Therefore, I intend to be limited only to the scope of the following claims.

I claim:

1. A method of producing friction elements from friction material and a synthetic rubber bonding agent to form a friction element which displays substantially no tendency to scuff or undergo thermal breakdown under conditions of use comprising, preparing a coating and wetting cement comprising a solvent and a butadiene-styrene synthetic rubber copolymer the monomers of which have been catalytically polymerized in a solution containing a catalyst selected from the group consisting of propylene added to a mixture of amylsodium and sodium isopropoxide; toluene and then propylene added to a mixture of amylsodium and sodium isopropoxide; toluene alone added to a mixture of amylsodium and sodium isopropoxide; diallyl added to amylsodium and sodium isopropoxide; propylene added to a mixture of amylsodium and sodium isopropoxide followed by the addition thereto of an excess of sodium isopropoxide; and propylene added to amylsodium and sodium isopropoxide followed by the addition thereto of an excess of sodium chloride; mixing together the said friction material and the said cement to produce a viscous, tacky mass, and then molding and curing said mass to produce a friction element.

2. A friction element comprising friction fibers and a bond therefor comprised of a butadiene-styrene synthetic rubber copolymer the monomers of which have been polymerized in a solution containing a catalyst selected from the group consisting of propylene added to a mixture of amylsodium and sodium isopropoxide; toluene and then propylene added to a mixture of amylsodium and sodium isopropoxide; toluene alone added to a mixture of amylsodium and sodium isopropoxide; diallyl added to amylsodium and sodium isopropoxide; proylene added to a mixture of amylsodium and sodium isopropoxide followed by the addition thereto of an excess of sodium isopropoxide; and propylene added to amylsodium and sodium isopropoxide followed by the addition thereto of an excess of sodium chloride.

3. A friction element comprising asbestos fibers and finely divided particles of friction stabilizing material bonded together with a thermally stable binder which comprises as the principal ingredient a butadiene-styrene synthetic rubber copolymer the monomers of which have been catalytically polymerized in a solution containing a catalyst selected from the group consisting of propylene added to a mixture of amylsodium and sodium isopropoxide; toluene and then propylene added to a mixture of amylsodium and sodium isopropoxide; toluene alone added to a mixture of amylsodium and sodium isopropoxide; diallyl added to amylsodium and sodium isopropoxide; propylene added to a mixture of amylsodium and sodium isopropoxide followed by the addition thereto of an excess of sodium isopropoxide; and propylene added to amylsodium and sodium isopropoxide followed by the addition thereto of an excess of sodium chloride.

4. A process for the manufacture of friction elements comprising mixing together asbestos fibers, finely divided friction stabilizing material, and a bonding agent comprising a butadiene-styrene synthetic rubber copolymer the monomers of which have been polymerized in a solution containing a catalyst selected from the group consisting of propylene added to a mixture of amylsodium and sodium isopropoxide; toluene and then propylene added to a mixture of amylsodium and sodium isopropoxide; toluene alone added to a mixture of amylsodium and sodium isopropoxide; diallyl added to amylsodium and sodium isopropoxide; propylene added to a mixture of amylsodium and sodium isopropoxide followed by the addition thereto of an excess of sodium isopropoxide; and propylene added to amylsodium and sodium isopropoxide followed by the addition thereto of an excess of sodium chloride; molding the mass into approximate shapes; and curing said shapes to their final form.

5. A process for the manufacture of friction elements comprising mixing together friction fibers, friction stabilizing material and a bonding agent comprising a butadiene-styrene synthetic rubber copolymer dispersed in a solvent selected from the group consisting of xylene and toluene, the monomers of said copolymer having been catalytically polymerized in a solution containing a catalyst selected from the group consisting of propylene added to a mixture of amylsodium and sodium isopropoxide; toluene and then propylene added to a mixture of amylsodium and sodium isopropoxide; toluene alone added to a mixture of amylsodium and sodium isopropoxide; diallyl added to amylsodium and sodium isopropoxide; propylene added to a mixture of amylsodium and sodium isopropoxide followed by the addition thereto of an excess of sodium isopropoxide; and propylene added to amylsodium and sodium isopropoxide followed by the addition thereto of an excess of sodium chloride; molding the mass into approximate shapes; and curing said shapes to their final form.

6. The process according to claim 5 in which said fibers are asbestos fibers and said friction stabilizing material is finely divided dried cashew nut shell liquid.

7. A process for the manufacture of friction elements comprising mixing friction fibers with a bonding agent comprising a butadiene-styrene synthetic rubber copolymer dispersed in a solvent therefor, the monomers of said copolymer having been catalytically polymerized in a solution containing a catalyst selected from the group consisting of propylene added to a mixture of amylsodium and sodium isopropoxide; toluene and then propylene added to a mixture of amylsodium and sodium isopropoxide; toluene alone added to a mixture of amylsodium and sodium isopropoxide; diallyl added to amylsodium and sodium isopropoxide; propylene added to a mixture of amylsodium and sodium isopropoxide followed by the addition thereto of an excess of sodium isopropoxide; and propylene added to amylsodium isopropoxide followed by the addition thereto of an excess of sodium chloride; molding the mass into approximate shapes; and curing said shapes to their final form.

References Cited in the file of this patent

UNITED STATES PATENTS

| Number | Name | Date |
|---|---|---|
| 1,866,287 | Blume | July 5, 1932 |

OTHER REFERENCES

Ind. & Eng. Chem., vol. 42, No. 8, "Alfin Catalysts and the Polymerization of Butadiene," Morton, pp. 1488–1496, Aug. 1950.

Journal Amer. Chem. Soc., vol. 72, No. 8, pp. 3785–3792, "Metalation of Olefins and Dienes and Their Use in Alfin Polymerization of Butadiene," Aug. 1950.

Journal Amer. Chem. Soc., vol. 69, pp. 950–961, "Polymerization—The Alfin Catalysts," April 1947.

Industrial and Engineering Chemistry, "Butadiene Polymers and Polyisoprene Prepared by Alfin and Emulsion Process," vol. 42, No. 1, Jan. 1950, pp. 95–102.